United States Patent
Takahashi et al.

(10) Patent No.: US 9,128,286 B2
(45) Date of Patent: Sep. 8, 2015

(54) DISPLAY DEVICE AND METHOD FOR MANUFACTURING THE DISPLAY DEVICE

(75) Inventors: Kouhei Takahashi, Chiba (JP); Takeshi Kuriyagawa, Mobara (JP); Daisuke Sonoda, Chiba (JP); Takuo Kaitoh, Mobara (JP); Katsumi Matsumoto, Mobara (JP)

(73) Assignee: Pixtronix, Inc., San Diego, CA (US)

( * ) Notice: Subject to any disclaimer, the term of this patent is extended or adjusted under 35 U.S.C. 154(b) by 469 days.

(21) Appl. No.: 13/429,470

(22) Filed: Mar. 26, 2012

(65) Prior Publication Data

US 2012/0287494 A1   Nov. 15, 2012

(30) Foreign Application Priority Data

May 11, 2011  (JP) ................................. 2011-106520

(51) Int. Cl.
*G02B 26/02* (2006.01)
*G09G 3/34* (2006.01)
*G02B 26/08* (2006.01)

(52) U.S. Cl.
CPC .............. *G02B 26/02* (2013.01); *G09G 3/3433* (2013.01); *G02B 26/0841* (2013.01); *G09G 2300/08* (2013.01)

(58) Field of Classification Search
CPC .... G02B 26/02; G02B 26/084; G09G 3/3433; G09G 2300/08
USPC ............... 359/227, 230, 233–236; 345/30, 32
See application file for complete search history.

(56) References Cited

U.S. PATENT DOCUMENTS

| 2006/0250325 A1 | 11/2006 | Hagood et al. |
| 2008/0237611 A1 | 10/2008 | Cok et al. |
| 2011/0102876 A1 | 5/2011 | Cho et al. |

FOREIGN PATENT DOCUMENTS

| CN | 101061431 A | 10/2007 |
| CN | 102023380 A | 4/2011 |
| JP | 2001330821 A | 11/2001 |
| JP | 3796208 B2 | 7/2006 |
| JP | 2008-197668 | 8/2008 |
| JP | 2009500663 A | 1/2009 |
| JP | 2010250005 A | 11/2010 |
| KR | 20100027827 A | 3/2010 |
| KR | 20100100401 A | 9/2010 |
| TW | 1318307 | 12/2009 |
| WO | WO 2006/091738 A1 | 8/2006 |
| WO | WO 2006/091860 | * 8/2006 |

OTHER PUBLICATIONS

Taiwan Search Report - TW101109383 - Tipo - 2014-12-16 (133185TW).

* cited by examiner

*Primary Examiner* — James Phan
(74) *Attorney, Agent, or Firm* — Edward A. Gordon; Foley & Lardner LLP (57) ABSTRACT

A metal layer is formed on a highly light-transmissive substrate; a resist mask having an opening pattern is formed on the metal layer; exposed portions of the metal layer is etched away in this state to form openings; then the resist mask is removed; and a surface of the metal layer and an inner side wall of each of the openings are oxidized to form a metal oxide layer. Thus, a front surface and a rear surface of the aperture plate are caused to have different reflectances. The oxide layer is formed at the same time as when the resist mask is ashed to remove resist.

11 Claims, 8 Drawing Sheets

DISPLAY DEVICE AND METHOD FOR MANUFACTURING THE DISPLAY DEVICE

CROSS REFERENCE TO RELATED APPLICATION

This application is based upon and claims the benefit of priority from the prior Japanese Patent Application No. 2011-106520, filed on 11 May, 2011, the entire contents of which are incorporated herein by reference.

FIELD

The present invention relates to a display device using a mechanical shutter and a method for manufacturing the same.

BACKGROUND

Recently, a display device using a mechanical shutter to which a MEMS (Micro Electronic Mechanical Systems) technology is applied (hereinafter, such a shutter will be referred to as a "MEMS shutter") has been a target of attention. Such a display device (hereinafter, referred to as a "MEMS display device") opens or closes MEMS shutters each provided in correspondence with each of pixels, at a high speed by use of transistors, to control the amount of light to be transmitted, and thus adjusts the brightness of an image (see, e.g., Japanese Laid-Open Patent Publication No. 2008-197668).

A mainstream gray scale system of such MEMS display devices is a time-ratio gray scale system of displaying an image by sequentially switching light provided from one of LED backlight units of red, green and blue to light provided from another of the LED backlight units. Accordingly, the MEMS display devices have features that polarizing films or color filters used for a liquid crystal display device are not required; and as compared with liquid crystal display devices, the efficiency factor of backlight is about 10 times higher, the power consumption is no more than half, and the color reproducibility is superior.

Figure 8:
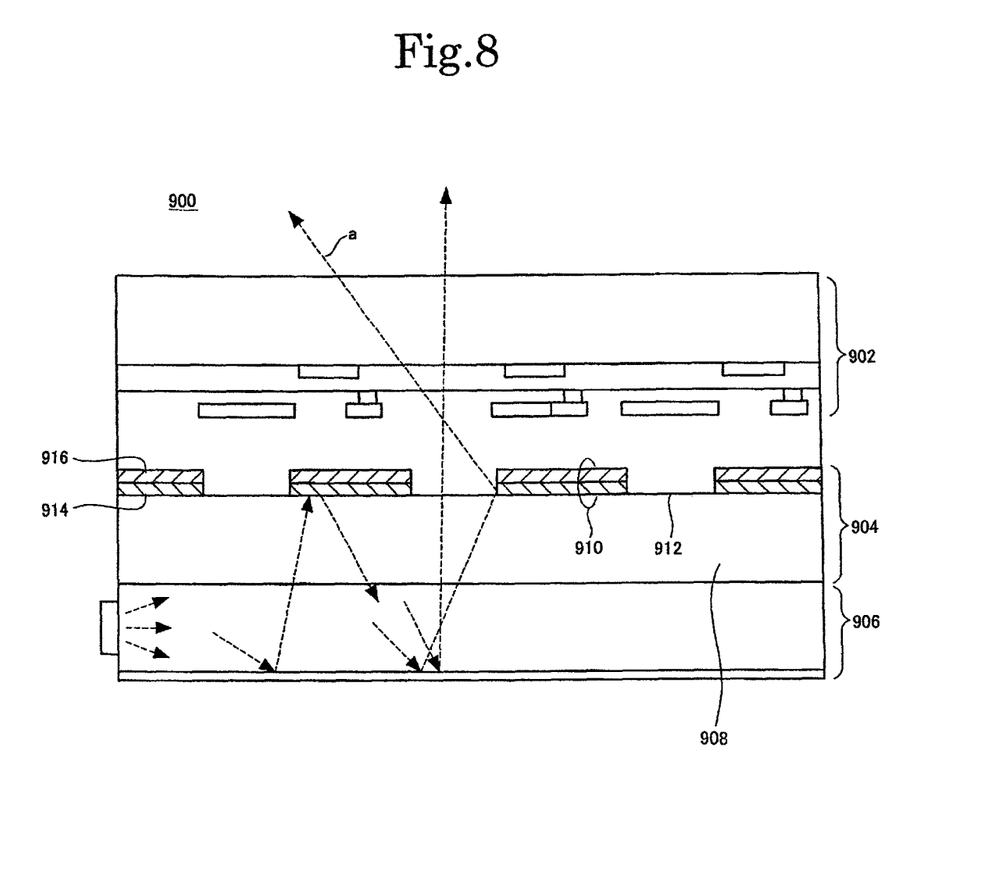
FIG. 8 shows a cross-sectional structure of a display device including an aperture plate which includes a metal layer having a two-layer structure.

As shown in FIG. 8, a display device 900 using MEMS shutters includes a MEMS shutter array 902, an aperture plate 904, and a backlight unit 906.

The aperture plate 904 includes a glass plate 908 and a metal layer 910 provided thereon and having openings 912. The aperture plate 904 is so configured that the metal layer 910 shields light from the backlight unit 906 and the light is transmitted only through the openings 912.

The aperture plate 904 is structured such that a surface of the metal layer 910 toward the glass plate 908 side has a high reflectance in order to effectively utilize the light from the backlight unit 906. By contrast, a surface of the metal plate 910 toward the MEMS shutter array 902 side, namely, toward the side of a display screen, needs to be designed to have a low reflectance in order to reduce the amount of light unnecessarily reflected after being incident from the MEMS shutter array 902 side.

In order to deal with these requirements, the metal layer 910 has a two-layer structure including a first metal layer 914 formed on the glass plate 908 side and having a high reflectance and a second metal layer 916 formed on the MEMS shutter array 902 side and having a relatively low reflectance. As a material for the first metal layer 914 having a high reflectance, silver, aluminum or the like is used. As a material for the second metal layer 916 having a relatively low reflectance, chromium or the like is used.

Therefore, in order to manufacture the aperture plate 904, it is required to form at least two types of metal layers on the glass plate and to form the openings 912. This requirement increases the number of steps for forming the metal layer and thus raises the material costs.

In addition, as shown in FIG. 8, the first metal layer 914 having a high reflectance has end surfaces exposed to the openings 912 formed in the metal layer 910. Such exposed portions scatter the light from the backlight unit 906 (scattered light represented by "a" in FIG. 8), which decreases the contrast.

An object of the present invention is to improve the contrast in a display device using MEMS shutters. Other object of the present invention is to easily manufacture an aperture plate, usable for a display device using MEMS shutters.

SUMMARY

One aspect of a display device according to the present invention comprises a MEMS shutter array provided over a front surface of a backlight unit for radiating light, the MEMS shutter array including MEMS shutters for controlling, by an open/close operation thereof, passage of the light radiated from the backlight unit toward a display screen; and an aperture plate provided between the backlight unit and the MEMS shutter array. The aperture plate includes a metal layer having openings formed in positions corresponding to the MEMS shutters and also includes a metal oxide layer formed on a surface of the metal layer facing the MEMS shutters.

One aspect of a method according to the present invention for manufacturing a display device including a MEMS shutter array and an aperture plate comprises the steps of forming a metal layer on a highly light-transmissive substrate; providing a resist mask having an opening pattern on the metal layer; etching away exposed portions of the metal layer in the state where the resist mask is provided on the metal layer, thereby forming openings reaching the highly light-transmissive substrate; removing the resist mask; and oxidizing a surface of the metal layer and a side wall of each of the openings, thereby causing a front surface and a rear surface of the aperture plate to have different reflectances.

BRIEF DESCRIPTION OF DRAWINGS

FIGS. 4(A)-(D) provide cross-sectional views showing an example of method for manufacturing an aperture plate in an embodiment according to the present invention;

FIGS. 5(A)-(D) provide cross-sectional views showing an example of method for manufacturing an aperture plate in an embodiment according to the present invention;

DESCRIPTION OF EMBODIMENTS

The preferred embodiments for realizing the present invention are explained below with referring to the drawings. Furthermore, the present invention is not limited to the embodiments explained below and various changes and modifications may be made without departing from the scope of the appended claims.

A display device in an embodiment according to the present invention includes a backlight unit for radiating light toward a display screen (i.e., a plane through which light is radiated outward); a MEMS shutter array provided over a front surface of the backlight unit, the MEMS shutter array including MEMS shutters for controlling, by an open/close operation thereof, an amount of light to be radiated from the backlight unit toward the display screen; and an aperture plate provided between the backlight unit and the MEMS shutter array. The aperture plate in the display device includes a metal layer having openings formed in positions corresponding to the MEMS shutters and also includes a metal oxide layer formed on a surface of the metal layer facing the MEMS shutters.

In the aperture plate in the display device, in order to cause a surface of the aperture plate facing the MEMS shutter array and an opposite surface thereto to have different reflectances, a metal oxide layer is provided on one surface of the metal layer. The aperture plate is located such that the metal oxide layer is directed toward the MEMS shutter array, and as a result, the reflectance as seen from the display screen side is decreased. By contrast, the surface of the aperture plate on the backlight unit side is a reflective surface of the metal layer, and thus can reflect the light from the backlight unit.

In such an embodiment of the aperture plate, the metal oxide layer may also be formed on a side surface of each of the openings in the metal layer. Therefore, light scattering at the side wall of the opening can be prevented.

It is preferable that the metal oxide layer is a layer of an oxide of a metal material used to form the metal layer. The metal oxide layer has a lower reflectance than that of the metal layer, and therefore, a front surface and a rear surface of the aperture plate have different reflectances.

The surface of the aperture plate facing the MEMS shutter array has a reflectance of 50% or lower, more preferably 40 to 30% or lower. Therefore, the display screen can be prevented from reflecting external light like a mirror surface.

It is preferable that the metal layer included in such an aperture plate is formed of silver or a silver alloy. A reason for this is that silver has a high reflectance for light in a visible range, and that the reflectance of silver oxide, which is an oxide of silver, is 50% or lower.

According to a method in an embodiment of the present invention for manufacturing a display device including a MEMS shutter array and an aperture plate, a metal layer is formed on a highly light-transmissive substrate; a resist mask having an opening pattern is provided on the metal layer; exposed portions of the metal layer is etched away in the state where the resist mask is provided on the metal layer, thereby forming openings reaching the highly light-transmissive substrate; then the resist mask is removed; and a surface of the metal layer and a side wall of each of the openings are oxidized, thereby causing a front surface and a rear surface of the aperture plate to have different reflectances.

The resist mask is removed by an ashing technique. Therefore, the surface of the metal layer and the side wall of each of the openings can be oxidized at the same time as the removal of the resist mask.

The surface of the metal layer and the side wall of each of the openings can be oxidized by an ozone oxidation technique or a plasma oxidation technique of generating oxygen radicals.

It is preferable that the metal layer included in such an aperture plate is formed of silver or a silver alloy. A reason for this is that silver has a high reflectance for light in a visible range, whereas the reflectance of silver oxide, which is an oxide of silver, is 50% or lower.

According to an embodiment of the present invention, the metal oxide layer is provided on a surface of the metal layer included in the aperture plate. Therefore, a front surface and a rear surface of the aperture plate can have different reflectances. Such an aperture plate is used for a display device using a MEMS shutter. Therefore, the display screen can be prevented from reflecting external light like a mirror surface, whereas the light from the backlight unit can be effectively used.

The metal oxide layer is also formed on the side wall of each of the openings in the aperture plate. Therefore, light scattering at the side wall is prevented, and thus decrease of the contrast is prevented.

According to an embodiment of the present invention, for manufacturing an aperture plate, there is no need to form a plurality of layers having different reflectances and merely one type of metal layer needs to be formed. This can simplify the manufacturing step. The surface of the metal layer included in the aperture plate can be oxidized at the same time as when the resist is stripped by ashing, and thus the surface is caused to have a low reflectance. Therefore, there is no need to provide an additional step for forming a metal oxide layer, which can simplify the manufacturing step.

The surface of the metal layer and also the side surface of each of the openings formed in the metal layer can have a low reflectance as a result of oxidation. Therefore, light scattering at the openings in the aperture plate is prevented, and thus a display device having an increased contrast can be provided.

Figure 1:
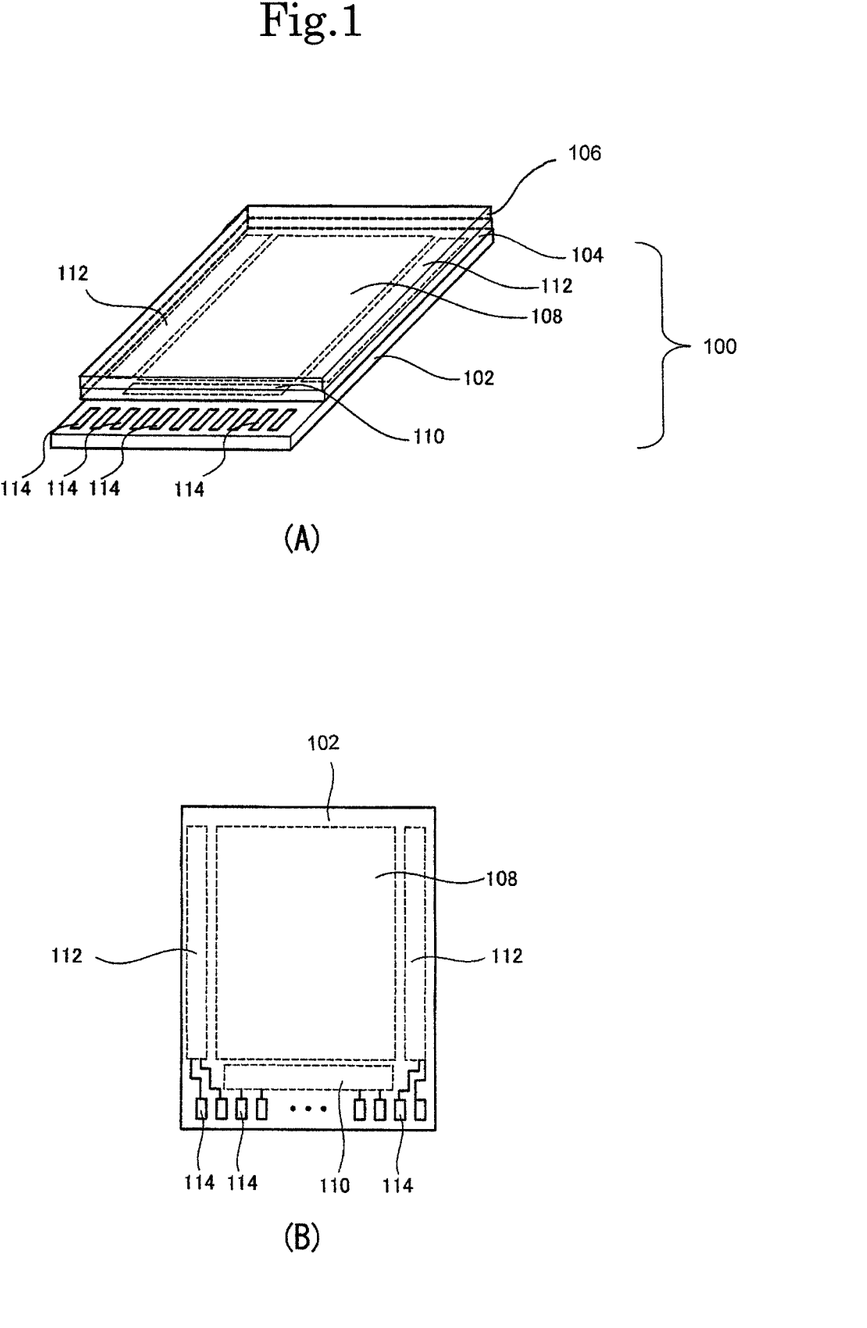
FIG. 1(A) is a perspective view of a display device in an embodiment according to the present invention.
FIG. 1(B) is a plan view thereof.

FIG. 1(A) is a perspective view of a display device 100 in an embodiment according to the present invention, and FIG. 1(B) is a plan view thereof. The display device 100 in an embodiment according to the present invention includes a MEMS shutter array 102 and an aperture plate 104. To the display device 100 in an embodiment according to the present invention, light from a backlight unit 106 controlled by a controller 116 (shown in FIG. 2) is supplied from the aperture plate 104 side. The display device 100 in an embodiment according to the present invention may include the controller 116 and the backlight unit 106.

A display section 108 is a part of the display device 100 in which a group of pixels described later are formed. Accordingly, hereinafter, the expression "display section 108" is to be understood as including a part of the MEMS shutter array 102 and a part of the aperture plate 104, the parts having the group of pixels formed therein. The display device 100 includes a gate driver 110, data drivers 112 and terminals 114 for driving each of pixels (including MEMS shutters) in the display section 108. In the example in FIG. 1, the data drivers 112 are shown as interposing the display section 108 from both sides thereof, but the structure of the data drivers 112 is not limited to this.

Figure 2:
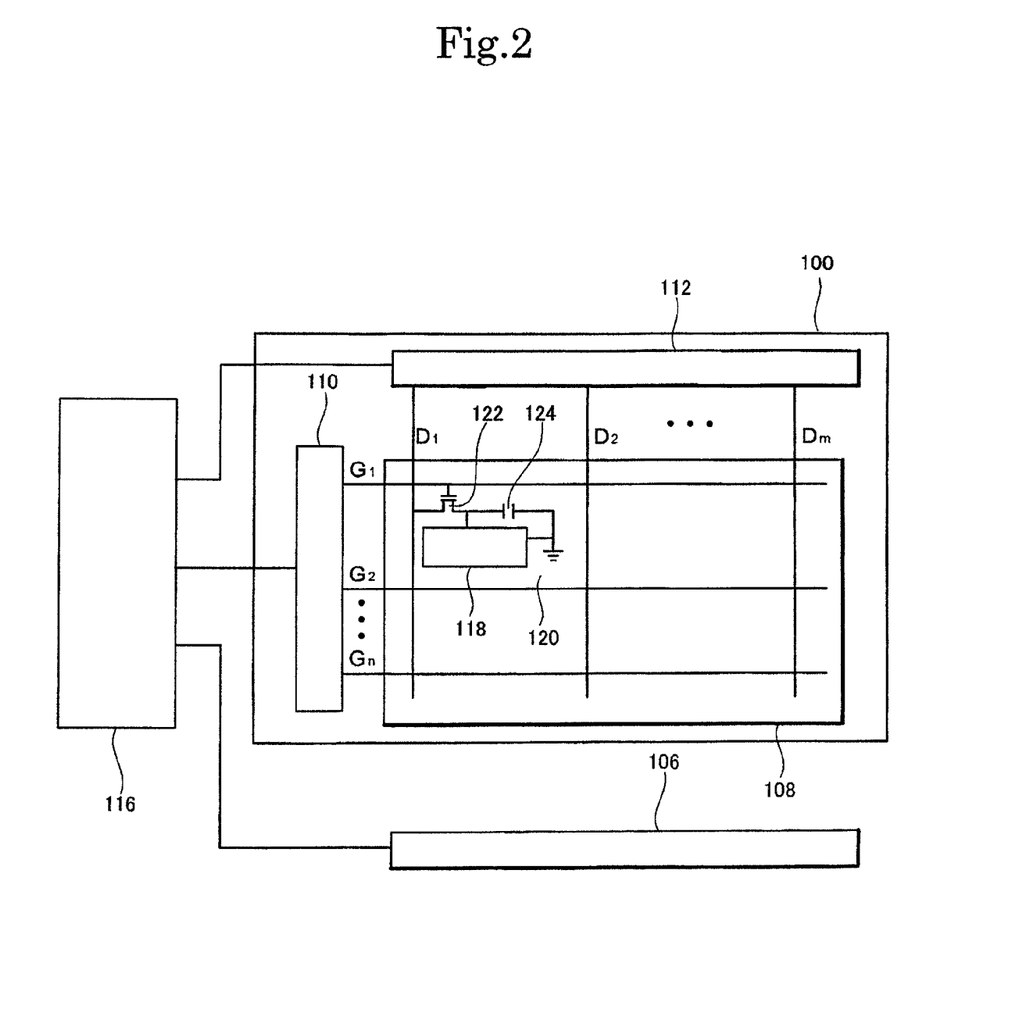
FIG. 2 is a block diagram of a circuit of a display device in an embodiment according to the present invention.

FIG. 2 is a block diagram showing an example of circuit of the display device 100. To the display device 100, an image signal and a scanning signal from the controller 116 are supplied via the data drivers 112 and the gate driver 110. Also to the display device 100, light from the backlight unit 106 controlled by the controller 116 is supplied.

The display section 108 includes pixels 120 located in a matrix, and the pixels 120 each include a MEMS shutter 118, a switching element 122 and a storage capacitance 124. The data drivers 112 supply a data signal to the switching elements 122 via data lines (D1, D2, . . . , Dm). The gate driver 110 supplies a gate signal to the switching elements 122 via gate lines (G1, G2, ..., Gn). The switching elements 122 each drive a corresponding MEMS shutter 118 based on a data signal supplied from a corresponding data line among the data lines (D1, D2, ..., Dm).

Figure 3:
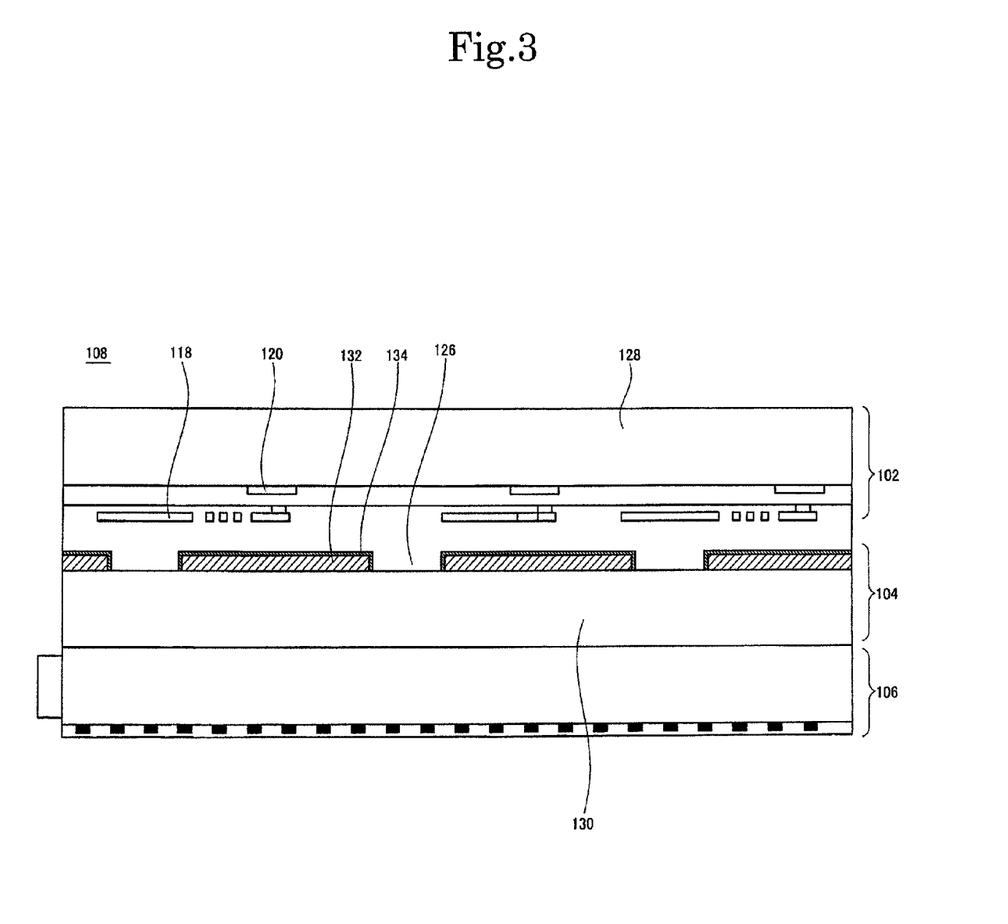
FIG. 3 shows a cross-sectional structure of a display device in an embodiment according to the present invention.

FIG. 3 shows a cross-sectional structure of the display section 108. In the display section 108, the MEMS shutters 118 provided in the MEMS shutter array 102 and openings 126 formed in a metal layer 132 in the aperture plate 104 are aligned to each other.

The MEMS shutters 118 are formed on a highly light-transmissive substrate 128. The each of the MEMS shutters 118 includes a plurality of components to perform mechanical operations. The operation of the MEMS shutters 118 is controlled by the switching element 122. The MEMS shutter 118 is slidable in a horizontal direction on the highly light-transmissive substrate 128 and operates to block or pass the light from the backlight unit 106 radiated through the opening 126 of the aperture plate 104.

The display section 108 displays a certain image by such an open/close operation of the MEMS shutter 118 based on an image signal. The MEMS shutter 118 is located close to a display screen (a plane through which an image is presented outside) of the display section 108. A surface of the aperture plate 104 is directed toward the display screen. When the surface of the aperture plate 104 has a high reflectance, the surface reflects external light and thus decreases the contrast. Therefore, the reflectance of external reflection at the surface of the aperture plate 104 for the light which is incident from the display screen side (hereinafter, such a reflectance will be referred to as a "display screen-side reflectance") needs to be suppressed low.

The display screen-side reflectance of the aperture plate 104 is desired to be 50% or lower, preferably 40 to 30% or lower, for light in a visible range. By contrast, the reflectance of internal reflection at a surface of the aperture plate 104 for the light incident from the backlight unit side (hereinafter, such a reflectance will be referred to as a "backlight-side reflectance") is preferably set to be high. This is for the purpose of reflecting the light from the backlight unit 106 by the surface of the aperture plate 104 so that the light is incident on the backlight unit 106 again, and thus utilizing the light effectively.

In order to realize these countervailing requirements, the surface of the aperture plate 104 according to the present invention has a metal layer 132 and a metal oxide layer 134 provided thereon. More specifically, on the surface of the aperture plate 104, a metal layer having a high reflectance is provided, and a layer of oxidized metal is provided so as to cover the metal layer. Therefore structure, the reflectance of external reflection at the surface of the aperture plate 104 is suppressed.

As shown in FIG. 3, the aperture plate 104 has a structure in which the metal layer 132 is first formed on a surface of a substrate 130, and on a surface of the metal layer 132, the oxide layer 134 is provided.

A preferable example of material for the metal layer 132 is silver or a silver alloy, and the oxide layer 134 is preferably a layer of an oxide of silver or an oxide of the silver alloy. Silver has a high reflectance for light in a visible range, whereas the reflectance of silver oxide is 50% or lower. Silver, which is a metal material, and an oxide thereof have such a difference in the light reflectance. A structure having a stack of silver and an oxide thereof is adopted for the aperture plate 104, so that such a difference is utilized to cause the aperture plate 104 to have a high reflectance of internal reflection for the light incident from the backlight unit 106 side and a low reflectance of external reflection for the light incident from the display screen side.

The oxide layer 134 is also formed on an inner side wall_of each of the openings 126 formed in the metal layer 132, and as a result, this portion also has a low reflectance. Therefore, light incident on the inner side wall of the opening 126 is prevented from being reflected and thus scattered. Namely, light scattering at an edge of the opening 126 in the metal layer 132 is prevented, and thus the contrast is improved.

Now, with reference to FIGS. 4(A) through (D), a method for manufacturing the aperture plate 104 usable for the display device in this embodiment will be described. In this embodiment, silver is used as the material for forming the metal layer 132. The present invention is not limited to such an example of this embodiment, and any metal material other than silver is applicable as long as such a metal material has a high reflectance for light in a visible range and a modified substance thereof (e.g., an oxide, a nitride, or a sulfide) has a low reflectance.

Figure 4:
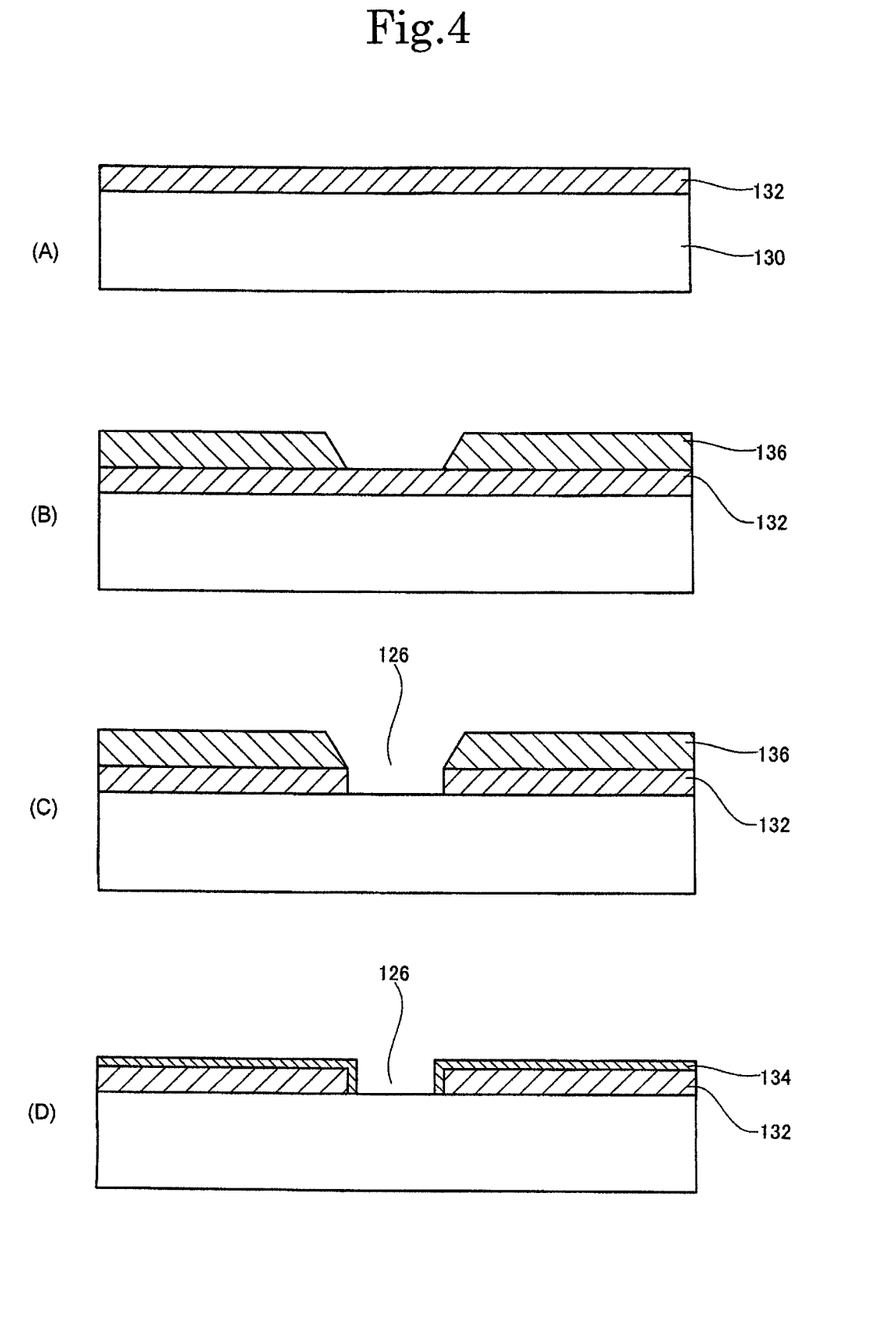

In the following description, (1) a manufacturing method by which a resist mask used for etching a metal layer is stripped and at the same time, a surface of the metal layer is oxidized will be described with reference to FIG. 4; and (2) a manufacturing method by which a resist mask used for etching a metal layer is stripped, and after that a surface of the metal layer is oxidized by a separate oxidation treatment will be described with reference to FIG. 5.

As the substrate 130 shown in FIG. 4(A), which is highly light-transmissive, a glass plate is used, for example. On the highly light-transmissive substrate 130, the metal layer 132 of silver or a silver alloy is formed. The metal layer 132 is formed by use of a vacuum vapor deposition technique or a sputtering technique. The metal layer 132 has a thickness of 50 nm or greater, preferably 100 nm or greater, in order to block the light from the backlight unit.

FIG. 4(B) shows a stage of forming the resist mask 136 in order to form the opening in the metal layer 132. The resist mask 136 may be formed by use of a known photolithography technique. The resist mask 136 may be directly formed on the metal layer 132.

FIG. 4(C) shows a stage of etching the metal layer 132. On this stage, an area of the metal layer 132 which is not covered with the resist mask 136 is etched away, and as a result, the opening 126 is formed in which the highly light-transmissive substrate 130 is exposed. The metal layer 132 is a single layer, and therefore does not require complicated conditions for etching.

FIG. 4(D) shows a stage of stripping the resist mask 136 and oxidizing the surface of the metal layer 132. According to this treatment, at the same time as when the resist mask 136 is stripped, the surface of the metal layer 132 is oxidized.

The resist mask 136 is removed by, for example, ashing. Usable techniques of ashing include both of photo-excited ashing, by which the resist is removed by ozone which is generated by radiation of ultraviolet or other types of light in a treatment chamber having oxygen introduced thereto, and plasma ashing, by which the resist is removed by use of oxygen plasma. By the photo-excited ashing, the generated ozone absorbs the ultraviolet to generate oxygen atoms in an excited state, and the surface of the metal layer 132 can be oxidized by these oxygen atoms having a strong oxidation power. By the plasma ashing, the oxide layer 134 can be formed on the surface of the metal layer 132 by active oxide radicals.

Figure 5:
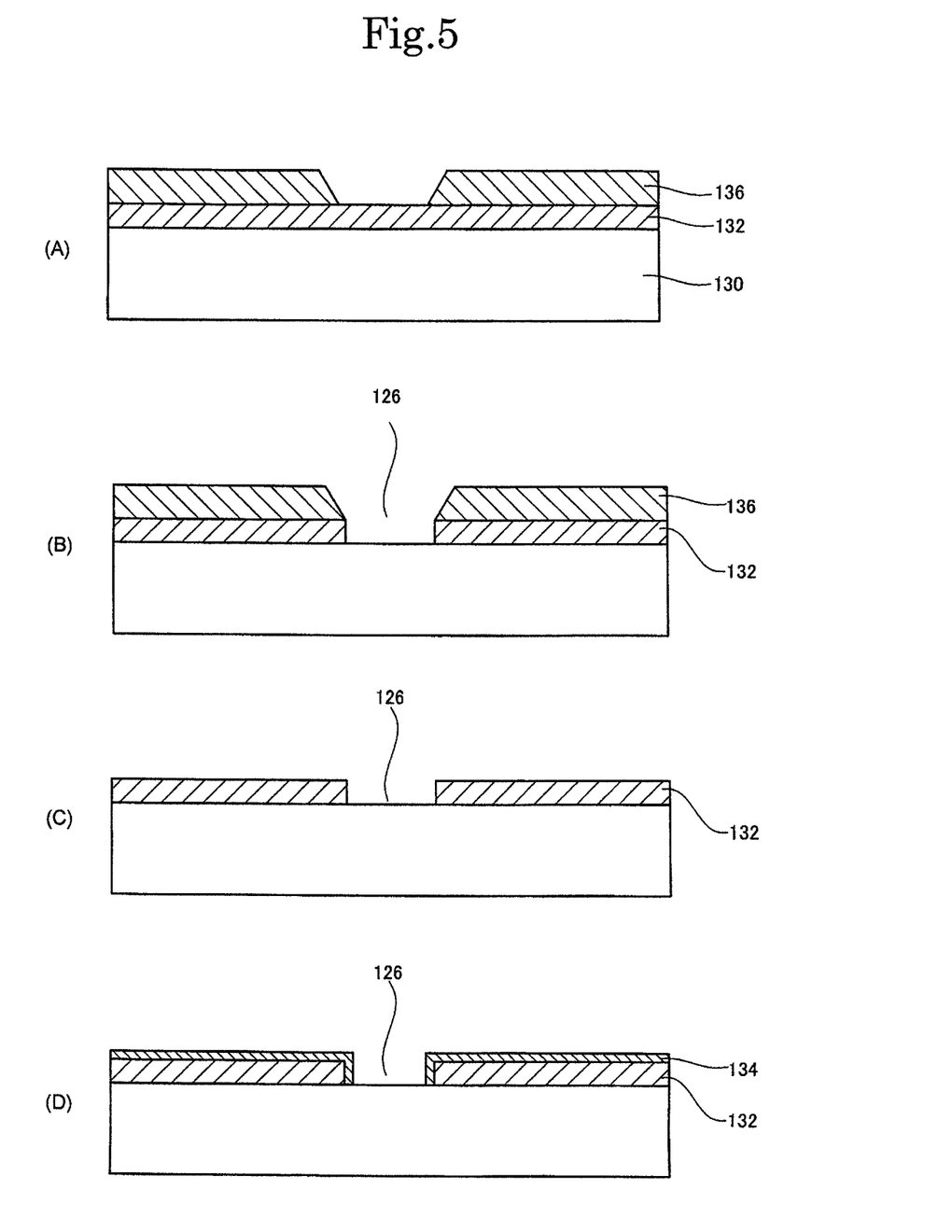

FIG. 5 shows a manufacturing method by which the resist mask used for etching the metal layer is stripped and after that, the surface of the metal layer is oxidized by a separate oxidation treatment.

FIG. 5(A) shows a stage of forming the resist mask 136 on the metal layer 132. After this stage, as shown in FIG. 5(B), the metal layer 132 is etched to form the opening 126. Then, as shown in FIG. 5(C), the resist mask 136 is removed by a resist stripper. After this, as shown in FIG. 5(D), on the surface of the metal layer 132 remaining on the substrate 130, the oxide layer 134 is formed by an oxidation treatment using ozone or by an oxidation treatment using oxide radicals, in a manner similar to the above.

In either case, the surface of the metal layer 132 and also a side surface of the metal layer 132 exposed to the opening 126 are oxidized to form the oxide layer 134. Therefore, the reflectance of the metal layer 132 and also the reflectance of the inner side wall of the opening 126 can be decreased.

There is no fixed limitation on the thickness of the oxide layer 134 to be formed on the metal layer 132, but the thickness is required to provide a reflectance of 50% or lower, preferably 40 to 30% or lower, for light in a visible range in correlation with the refractive index of the material of the oxide layer 134.

The step described above with reference to FIGS. 4(A) through (D) has an advantage that there is no need to form a plurality of layers having different reflectances and merely one type of metal layer needs to be formed. The step has another advantage that the surface of the metal layer included in the aperture plate 104 can be oxidized at the same time as when the resist is stripped by ashing, and thus the surface is caused to have a low reflectance. This step has still another advantage that the surface of the metal layer included in the aperture plate 104 and also a side surface of the opening formed in the metal layer can have a low reflectance as a result of oxidation.

Now, a structure of the MEMS shutter 118, which is another element of the display device in this embodiment, will be described.

Figure 6:
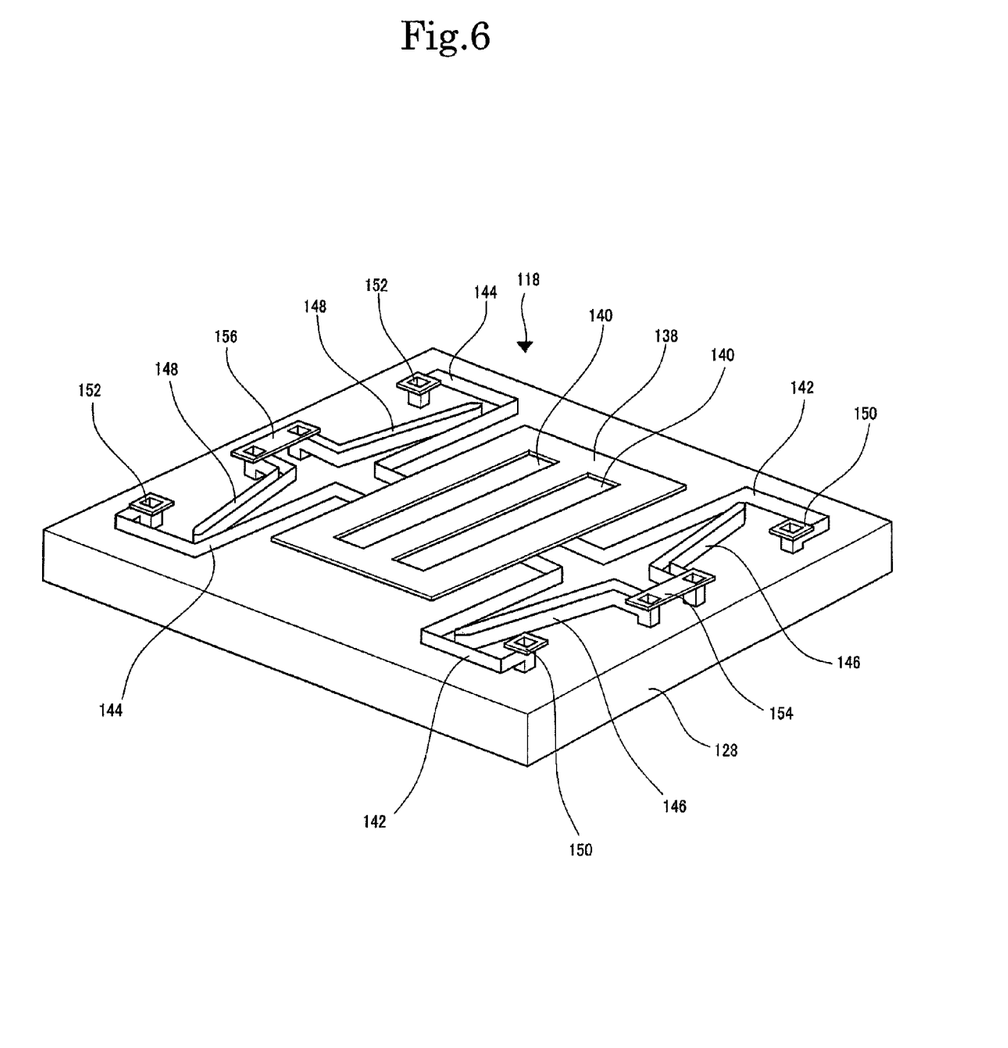
FIG. 6 is a perspective view showing a structure of a MEMS shutter usable for a display device in an embodiment according to the present invention.

FIG. 6 shows a structure of the MEMS shutter 118 usable for the display device 100. The MEMS shutter 118 includes a shutter 138, first springs 142 and 144, second springs 146 and 148, first anchor sections 150 and 152, and second anchor sections 154 and 156. These are provided on the highly light-transmissive substrate 128. The shutter 138 is a rectangular plate, and has two rectangular slit-like shutter openings 140 formed parallel to the longer sides of the shutter 138. A part of the shutter 138 other than the two shutter openings 140 (hereinafter, this part will be referred to as "shutter body") acts as a light-blocking part.

The shutter 138 is formed of a material which is very highly light-transmissive. When the shutter openings 140 generally overlap the above-described opening of the aperture plate 140, the light from the backlight unit 106 is transmitted. When the shutter body overlaps the opening of the aperture plate 140, the light from the backlight unit 106 is blocked.

One of the longer sides of the shutter 138 is connected to the first anchor sections 150 via the first springs 142. The other longer side of the shutter 138 is connected to the first anchor sections 152 via the first springs 144. The first anchor sections 150 and 152, together with the first springs 142 and 144, have a function of supporting the shutter 138 in a state of floating above the surface of the light-transmissive substrate 128.

The first anchor sections 150 are electrically connected to the first springs 142. Therefore, when the first anchor sections 150 are supplied with a bias potential, the first springs 142 also obtain a potential approximately equal to the potential of the first anchor sections 150. The first anchor sections 152 and the first springs 144 also have this relationship. The second springs 146 are connected to the second anchor section 154. The second anchor section 154 has a function of supporting the second springs 146. The second anchor section 154 is electrically connected to the second springs 146. The second anchor section 154 has the ground potential, and therefore the second springs 146 also have the ground potential. The second anchor section 156 and the second springs 148 also have this relationship.

When a certain bias potential is supplied to the first springs 142 and the second springs 146 obtain the ground potential, the first springs 142 and the second springs 144 are electrostatically driven by the potential difference between the first springs 142 and the second springs 146, and thus are moved so as to be attracted to each other. As a result, the shutter 138 is slid in one direction. When a certain bias potential is supplied to the first springs 144 and the ground potential is supplied to the second springs 148, the first springs 144 and the second springs 148 are electrostatically driven by the potential difference between the first springs 144 and the second springs 148, and thus are moved so as to be attracted to each other. As a result, the shutter 138 is slid in a direction opposite to the above-mentioned one direction.

The MEMS shutter 118 shown in FIG. 6 is merely an example of MEMS shutter usable for the display device 100. Any form of MEMS shutter which can be driven by a switching element is usable in this embodiment.

According to the display device of the present invention, the light from the backlight unit 106 which has been transmitted through the openings of the aperture plate 104 is partially or entirely restricted from passing forward by the open/close operation of the MEMS shutter as shown in FIG. 6. In this manner, the amount of light which is output from the display screen to outside can be controlled. Thus, the gray scale display can be realized on the display screen. The MEMS shutter 118 is moved by an electrostatic force, and therefore is operable at a high speed. By sequential driving (field sequential driving) performed on LEDs of the R, G and B colors in the backlight unit 106, color display is realized. In this case, polarizing plates or color filters which are required for a liquid crystal display device are not required. Therefore, the light from the backlight unit 106 can be utilized without being attenuated. In addition, the reflectance of the metal layer 132 in the aperture plate 104 at the display screen side surface and the reflectance at the inner side wall of each of the openings in the metal layer 132 are decreased. Therefore, reflection of external light, and scattering of light at an edge of each of the openings, can be suppressed, and thus the contrast of the image displayed on the display screen can be improved. Furthermore, the surface, on the backlight unit side, of the metal layer 132 in the aperture plate 104 has a high reflectance. Therefore, the light from the backlight unit 106 can be multiple-reflected to realize effective utilization of light.

In the above description, a structure in which the MEMS shutter array 102 and the aperture plate 104 are provided as separate substrates and are combined has been described. The present invention is not limited to such a structure. For example, as described later with reference to FIG. 7, the MEMS shutter array 102 and the aperture plate 104 may be provided on the same substrate.

Figure 7:
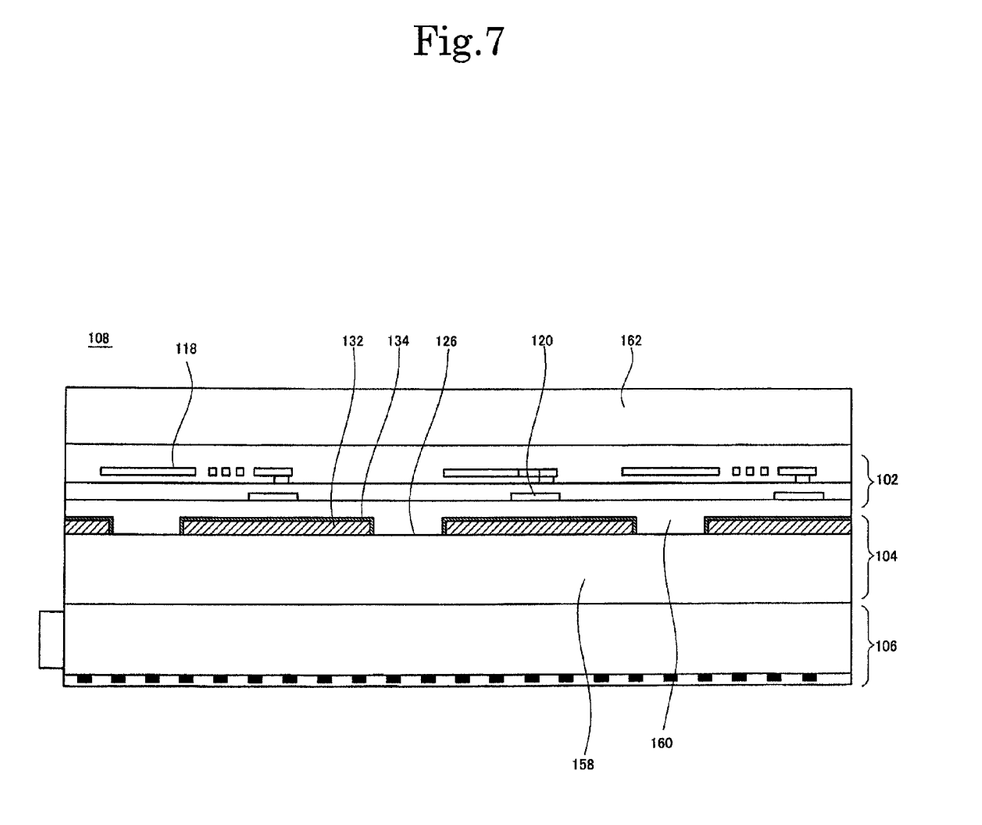
FIG. 7 shows a cross-sectional structure of a display device in an embodiment according to the present invention.

In FIG. 7, on a highly light-transmissive substrate 158, the aperture plate 104 is first provided. On a surface of the metal layer 132 in the aperture plate 104, the oxide layer 134 is formed and the openings 126 are formed in correspondence with the pixels as described above with reference to FIG. 3.

The metal layer 132 is buried in a flat film 160. The flat film 160 is formed of, for example, an insulating film of silicon oxide or the like. Burying the metal layer 132 in an insulating film of an oxide material is expected to provide an effect that oxygen is prevented from being drawn out from the oxide layer 134 and thus the layer 134 is prevented from being reduced. A surface of the flat film 160 can be flattened by chemical mechanical polishing.

On the flat film 160, the MEMS shutter array 102 is formed. The details of the MEMS shutters 118 are substantially the same as those shown in FIG. 6. The MEMS shutters 118 are located at positions matching the positions of the openings 126 in the aperture plate 104, and the operation of each MEMS shutter 118 is controlled by the corresponding switching element. On the MEMS shutter array 102, a sealing substrate 162 is provided.

The backlight unit 106 is provided on the highly light-transmissive substrate 158 side. A display device having such a structure is also expected to provide an effect that the reflectance of internal reflection at the surface of the aperture plate 104 for the light incident from the backlight unit 106 side is high and the reflectance of external reflection at the surface of the aperture plate 104 for the light incident from the display screen side is low. As a result, decrease of the contrast of the image displayed on the display screen is suppressed, and therefore the effective utilization of light radiated from the backlight unit 106 can be realized. The manufacturing step of the aperture plate 104 is substantially the same as that shown in FIG. 4, and thus can be simple.

What is claimed is:

1. A display device comprising:
   a MEMS shutter array provided over a front surface of a backlight unit for radiating light, the MEMS shutter array including MEMS shutters for restricting, by an open/close operation thereof, passage of the light radiated from the backlight unit; and
   an aperture plate provided between the backlight unit and the MEMS shutter array, the aperture plate including a metal layer having openings in positions corresponding to the MEMS shutters and also including a metal oxide layer on a surface of the metal layer facing the MEMS shutters, wherein the metal oxide layer is also on an inner side wall of each of the openings in the metal layer.

2. A display device according to claim 1, wherein the metal oxide layer is a layer of an oxide of a metal material used to form the metal layer.

3. A display device according to claim 1, wherein a surface of the aperture plate facing the MEMS shutter array has a reflectance of 50% or lower.

4. A display device according to claim 1, wherein the metal layer includes silver.

5. A display device according to claim 1, wherein the metal layer includes a silver alloy.

6. A display device according to claim 4, wherein the metal oxide layer is a layer of silver oxide.

7. A display device according to claim 1, wherein the openings are filled with a transparent insulating substance.

8. A display device according to claim 7, wherein
   the surface of the aperture plate is covered with the transparent insulating substance to form a flat film having a flat surface; and
   the MEMS shutter array is constructed on the surface of the film of the transparent insulating substance.

9. A display device according to claim 1, wherein
   the backlight unit sequentially radiates light of three primary colors of red, green and blue; and
   the MEMS shutters are driven in correspondence with each of the colors to adjust amount of lights which are to pass the MEMS shutters among the lights transmitted through the openings.

10. An aperture plate provided between a backlight unit for radiating light and a MEMS shutter array including MEMS shutters for controlling, by an open/close operation thereof, the aperture plate comprising:
    a metal layer having openings in positions corresponding to the MEMS shutters; and
    a metal oxide layer on a surface of the metal layer facing the MEMS shutters, wherein the metal oxide layer is also on an inner side wall of each of the openings in the metal layer.

11. An aperture plate according to claim 10, wherein the oxide layer is a result of oxidation of the surface of the metal layer.

* * * * *